United States Patent
Böwing et al.

(10) Patent No.: US 9,670,829 B2
(45) Date of Patent: Jun. 6, 2017

(54) PISTON OF AN INTERNAL COMBUSTION ENGINE

(71) Applicant: Caterpillar Energy Solutions GmbH, Mannheim (DE)

(72) Inventors: Robert Böwing, Innsbruck (AT); Enrico Drehobl, Reilingen (DE); Christian Drexel, Lambsheim (DE); Manfred Rapp, Ubstadt-Weiher (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 106 days.

(21) Appl. No.: 14/391,388

(22) PCT Filed: Apr. 12, 2013

(86) PCT No.: PCT/EP2013/001076
§ 371 (c)(1),
(2) Date: Oct. 8, 2014

(87) PCT Pub. No.: WO2013/152865
PCT Pub. Date: Oct. 17, 2013

(65) Prior Publication Data
US 2015/0107559 A1   Apr. 23, 2015

(30) Foreign Application Priority Data
Apr. 13, 2012 (DE) .................. 10 2012 103 212

(51) Int. Cl.
*F02B 23/06* (2006.01)
*F02F 3/28* (2006.01)

(52) U.S. Cl.
CPC ............ *F02B 23/0639* (2013.01); *F02F 3/28* (2013.01); *Y02T 10/125* (2013.01)

(58) Field of Classification Search
CPC ...... Y02T 10/125; F02B 23/0696; F02F 3/28; F02F 3/0076; F02F 3/24
(Continued)

(56) References Cited

U.S. PATENT DOCUMENTS 210,448 A * 12/1878 Bridges .................. B66C 1/485
                                                      37/341
2,172,170 A   9/1939 Megroot
(Continued)

FOREIGN PATENT DOCUMENTS

| CH | 183532 A | 4/1936 |
|---|---|---|
| DE | 2711681 A1 | 5/1978 |

(Continued)

OTHER PUBLICATIONS

International Search Report mailed Aug. 14, 2013, in Application No. PCT/EP2013/001076 by European Patent Office (3 pages).
(Continued)

*Primary Examiner* — Long T Tran

(57) ABSTRACT

An engine block of an internal combustion engine is disclosed. The engine block may have a piston and at least one gas exchange valve. The piston may have a piston skirt having a first center axis. The piston may also have a piston head delimiting the piston skirt at the top with a diameter D. The piston head may have a piston head edge and a piston head recess with a piston recess wall having a height H. At least one valve pocket may be formed into the piston head edge. The at least one valve pocket may have a valve pocket depth T with respect to the piston head edge. The valve pocket depth T may fulfill the following condition with respect to the wall height H: $0.05\ H \leq T \leq 0.5H$.

20 Claims, 2 Drawing Sheets

(58) Field of Classification Search
USPC ....... 123/47 R, 193.3, 193.6; 92/162 R, 172, 92/176, 181 R, 182, 183
See application file for complete search history.

(56) References Cited

U.S. PATENT DOCUMENTS

| | | | |
|---|---|---|---|
| 3,469,564 A * | 9/1969 | Hiereth | F02B 23/0639 123/260 |
| 3,508,531 A * | 4/1970 | Squinto | F16J 1/001 123/193.6 |
| 4,083,330 A | 4/1978 | Morris | |
| 4,114,518 A * | 9/1978 | Glover, Jr. | F02F 3/28 123/193.6 |
| 4,166,436 A | 9/1979 | Yamakawa | |
| 4,281,629 A | 8/1981 | List | |
| 4,291,655 A | 9/1981 | Yamakawa | |
| 4,440,125 A * | 4/1984 | Case | F02B 19/14 123/263 |
| 4,467,752 A * | 8/1984 | Yunick | F02B 23/08 123/193.5 |
| 4,522,172 A | 6/1985 | Oshima et al. | |
| 4,635,597 A | 1/1987 | Ohashi et al. | |
| 4,721,080 A | 1/1988 | Moriyasu et al. | |
| 4,745,891 A * | 5/1988 | Cola | F02B 23/08 123/193.6 |
| 4,771,748 A | 9/1988 | Chmela et al. | |
| 5,065,715 A | 11/1991 | Evans | |
| 5,103,784 A | 4/1992 | Evans | |
| 5,285,755 A * | 2/1994 | Regueiro | F01L 1/26 123/193.6 |
| 5,329,902 A | 7/1994 | Sakamoto et al. | |
| 5,390,634 A * | 2/1995 | Walters | F02B 23/08 123/193.5 |
| 5,617,823 A | 4/1997 | Gray, Jr. et al. | |
| 5,816,229 A * | 10/1998 | Roderweiss | F02B 23/08 123/193.6 |
| 6,213,086 B1 | 4/2001 | Chmela et al. | |
| 6,708,666 B2 | 3/2004 | Roberts, Jr. | |
| 6,745,745 B2 | 6/2004 | Huebler et al. | |
| 6,845,741 B2 * | 1/2005 | Saruwatari | F02B 17/00 123/193.6 |
| 6,928,997 B2 * | 8/2005 | Yu | F02B 23/104 123/193.6 |
| 6,971,365 B1 | 12/2005 | Najt et al. | |
| 7,055,491 B2 | 6/2006 | Linderyd et al. | |
| 7,185,614 B2 | 3/2007 | Meffert et al. | |
| 7,210,448 B2 * | 5/2007 | Stanton et al. | 123/298 |
| 7,472,678 B2 * | 1/2009 | Tsujimoto | F02B 23/0696 123/193.6 |
| 8,459,229 B2 | 6/2013 | Rothbauer et al. | |
| 2004/0060537 A1 | 4/2004 | Liu et al. | |
| 2007/0261663 A1 * | 11/2007 | Lineton | B23K 26/34 123/270 |
| 2008/0135016 A1 * | 6/2008 | Ashizawa | F02B 23/101 123/301 |
| 2008/0276900 A1 * | 11/2008 | Umierski | F02B 23/08 123/193.6 |
| 2010/0108044 A1 | 5/2010 | Liu | |
| 2011/0253095 A1 | 10/2011 | Rothbauer et al. | |
| 2013/0220266 A1 | 8/2013 | Bandyopadhyay et al. | |

FOREIGN PATENT DOCUMENTS

| | | |
|---|---|---|
| DE | 2945490 A1 | 5/1980 |
| DE | 3590066 C2 | 4/1986 |
| DE | 29515308 U1 | 1/1996 |
| DE | 19927479 A1 | 12/1999 |
| DE | 10261185 A1 | 7/2004 |
| DE | 10 2005 037562 A1 | 5/2006 |
| DE | 10 2009 025063 A1 | 12/2010 |
| DE | 10 2010 027 637 | 1/2012 |
| EP | 0 969 191 A2 | 1/2000 |
| FR | 801 538 A | 8/1936 |
| FR | 2 451 458 A2 | 10/1980 |
| FR | 2 884 284 A1 | 10/2006 |
| FR | 2 927 121 A1 | 8/2009 |
| GB | 522 313 | 6/1940 |
| GB | 2 024 321 A | 1/1980 |
| GB | 2 074 231 A | 10/1981 |
| JP | S52-97009 A | 8/1977 |
| JP | 59-158317 | 9/1984 |
| JP | 62-075019 A | 4/1987 |
| JP | S62-113822 A | 5/1987 |
| JP | S63-001710 A | 1/1988 |
| JP | H07-026959 A | 1/1995 |
| JP | H09-228838 A | 2/1997 |
| JP | H09-096241 A | 4/1997 |
| JP | 11-093779 | 4/1999 |
| JP | 2001-227346 A | 8/2001 |
| JP | 2010-112347 A | 5/2010 |
| JP | 2012-021429 A | 2/2012 |
| WO | WO 85/00198 | 1/1985 |
| WO | WO 02/088528 A1 | 7/2002 |
| WO | WO 2010/142389 | 12/2010 |

OTHER PUBLICATIONS

U.S. Appl. No. 14/391,330, of Robert Böwing et al., filed Oct. 8, 2014.
U.S. Appl. No. 14/391,371, of Robert Böwing et al., filed Oct. 8, 2014.
U.S. Appl. No. 14/391,390, of Robert Böwing et al., filed Oct. 8, 2014.
International Search Report mailed Aug. 8, 2013, in Application No. PCT/EP2013/001075 by European Patent Office (2 pages).
International Search Report mailed Jun. 9, 2013, in Application No. PCT/EP2013/001087 by European Patent Office (3 pages).
International Search Report mailed Sep. 3, 2013, in Application No. PCT/EP2013/001088 by European Patent Office (3 pages).
Office Action issued in Austrian Patent Application No. A 9148/2013, mailed Feb. 17, 2015 (1 page).
Office Action issued in Austrian Patent Application No. A 9146/2013, mailed Apr. 4, 2013 (1 page).

* cited by examiner

PISTON OF AN INTERNAL COMBUSTION ENGINE

CLAIM FOR PRIORITY

This application is a U.S. National Phase entry under 35 U.S.C. §371 from PCT International Application No. PCT/EP2013/001076, filed Apr. 12, 2013, which claims benefit of priority of German Patent Application No. 102012103212.2, filed Apr. 13, 2012, all of which are incorporated herein by reference.

TECHNICAL FIELD

The present disclosure generally relates to a piston of an internal combustion engine. Particularly, it relates to a piston having a piston skirt and a piston head. The piston head may delimit the piston skirt at the top. The piston head may be formed from a piston head edge and a piston head recess with a piston recess wall having a height H. At least one valve pocket, which has a depth T with respect to the piston head edge, may be formed in or being let into the piston head edge.

The present disclosure also relates to an engine block of an internal combustion engine, such as an Otto engine with external mixture formation. A piston and at least one gas exchange valve may be being guided therein. The piston may have a piston skirt and a piston head, delimiting the piston skirt at the top. The piston head may be formed from a piston head edge and a piston head recess with a piston recess wall having a height H. At least one valve pocket, which may have a minimum distance a to the gas exchange valve, which ensures free movement of the open gas exchange valve, may be formed in the piston head edge.

BACKGROUND

A piston for an internal combustion engine, which has four valve pockets inside the piston head, ensuring a free movement of the exhaust and inlet valves, is, for example, known from DE 10 2010 018 930 A1.

In the case of an Otto gas engine, pistons with different piston recess shapes are used. As a rule, a differentiation is made between the following customary variants:

A) Piston with roof-shaped piston head. The piston head is designed for combustion processes with gas-purged pre-chambers so that the torch jets impinge upon the combustion chamber walls as late as possible.

B) Piston with bathtub piston head. The piston head is designed so that a tumble flow, which is generated on the inlet side, is maintained.

C) Piston with omega-shaped piston head recess. The piston head is designed for diesel operation for optimum direct injection and for cost reasons and for the sake of simplicity is also used in an unmodified state in the Otto gas engine. The latter is in spite of a potentially poorer combustion result.

D) Piston with pot-shaped piston head recess. The piston head is designed so that a squish flow is created in the radial direction between piston edge and cylinder head. The swirl flow in the pot-shaped piston head recess is also strengthened.

Pistons with pot-shaped piston head recesses are very well suited to engines with swirl inlet passages and chamber spark plugs. During the compression cycle, the mixture is displaced over the piston head edge (squish edge) of the piston into the pot-shaped piston head recess. During the expansion cycle, the mixture is again sucked from the pot-shaped piston head recess. This process leads to strong squish flows, especially in the proximity of the top dead centre position.

In addition to the squish flow, the pot-shaped piston head recess also leads to an acceleration of the swirl flow which is generated on the inlet side. On account of the conservation of angular momentum, the rotational velocity of the swirl flow is increased if the mixture is displaced inwardly into the pot-shaped piston head recess.

The present disclosure is directed, at least in part, to improving or overcoming one or more aspects of the prior systems.

SUMMARY OF THE DISCLOSURE

In one aspect the present disclosure is directed to a piston of an internal combustion engine. The piston may comprise a piston skirt having a centre axis M, and a piston head delimiting the piston skirt to a top. The piston head may have having a diameter D and being formed from a piston head edge and a piston head recess with a piston recess wall having a wall height H. At least one valve pocket may be formed in the piston head edge. The at least one valve pocket may have a valve pocket depth T with respect to the piston head edge, wherein the valve pocket depth T with respect to the wall height H may fulfil the following condition, at least in the region of the piston recess wall (3): $0.05\ H <= T <= 0.5\ H$, particularly, for example, $0.05\ H <= T <= 0.2\ H$, or $0.1\ H <= T <= 0.2\ H$.

In another aspect the present disclosure is directed to an engine block of an internal combustion engine. The engine block may comprise a piston guided in the engine block. The piston may include a piston skirt having a centre axis M and a piston head delimiting the piston skirt to a top, with a diameter D. The piston head may be formed from a piston head edge and a piston head recess with a piston recess wall having a wall height H. At least one valve pocket may be formed in the piston head edge. At least one gas exchange valve may have a centre axis and a minimum distance a to the piston head recess for ensuring a free movement of the open gas exchange valve. At least one valve pocket is designed at least partially significantly deeper than is necessary for the free movement of the open gas exchange valve. The distance a may be increased to a distance A at least in the region of the piston recess wall, with $A >= a+2$ mm.

BRIEF DESCRIPTION OF THE DRAWINGS

Further advantages and details of the present disclosure are explained in the claims and in the description and are represented in the figures. In the drawing:

DETAILED DESCRIPTION

Figure 1:
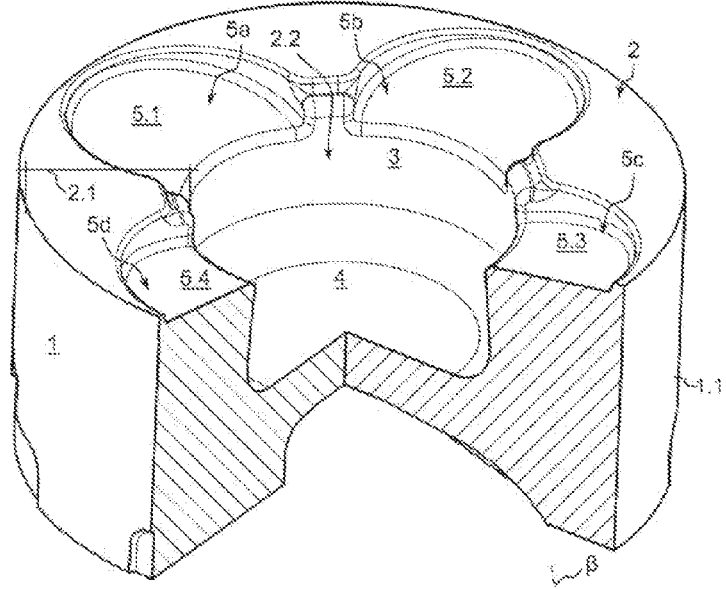
FIG. 1 shows a perspective view of the piston.

A piston 1 shown in FIG. 1 has a piston skirt 1.1 and a piston head 2 which delimits the piston skirt 1.1 at the top. The piston head 2 is formed from a piston head edge 2.1 and a piston head recess 2.2 which extends coaxially to a centre axis M. The piston head recess 2.2 has a piston recess bottom 4, which delimits the piston head recess 2.2 at the bottom, and a piston recess wall 3 which adjoins the piston recess bottom 4. Four valve pockets 5.1 to 5.4, which are in a circumferentially distributed arrangement, are provided inside the piston head edge 2.1.

Figure 2:
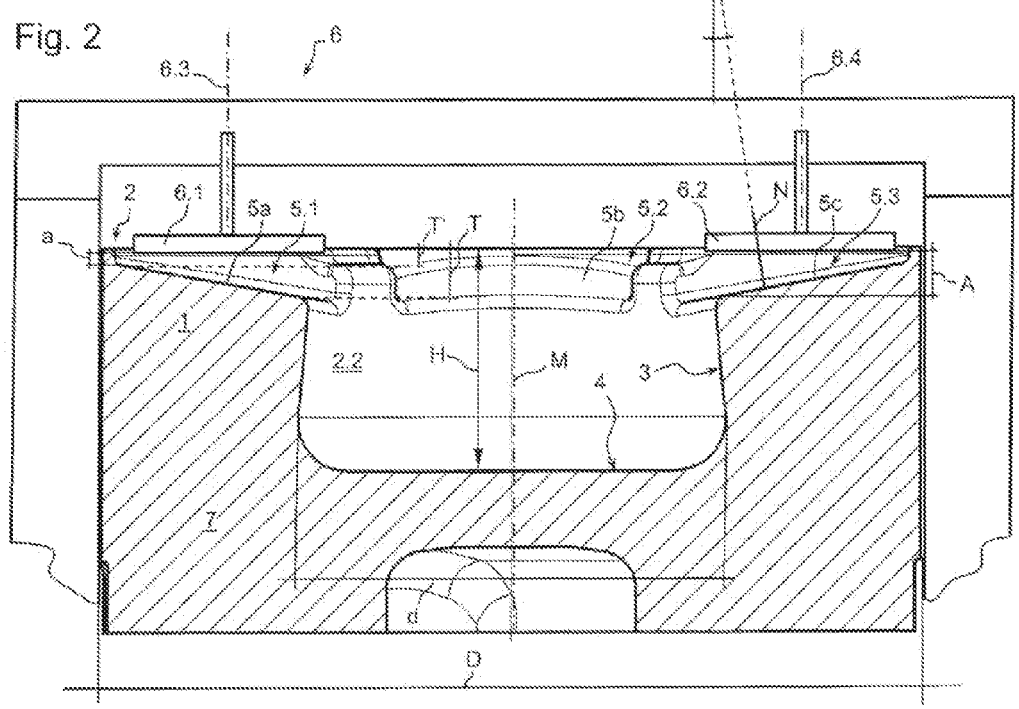
FIG. 2 shows a sectional view of the piston.

As shown in FIG. 2, the respective valve pocket 5.1 to 5.4 has a valve pocket bottom 5a-5d which is inclined with respect to the centre axis M on the one hand and with respect to a valve axis 6.3, 6.4 on the other hand. A surface normal N, which is formed on the respective valve pocket bottom 5a-5d, includes an angle β of about 7 degrees with the centre axis M or with the respective axis 6.3, 6.4 of the gas exchange valve. Starting from a distance a, which the respective gas exchange valve 6.1, 6.2 has to the piston head 2.1 or to the valve pocket bottom 5a-5d, this distance a increases continuously according to FIG. 2, on the right-hand side, to a distance A and is maximum in the region of the piston recess wall 3 or at the level of the piston recess wall 3 in the radial direction to the centre axis M.

In a corresponding way, a depth T of the respective valve pocket 5.1 in the edge region of the piston 1 with T' is significantly smaller than a depth T in the region of the piston recess wall 3.

The depth T is about 15% of the height H of the piston head recess 2.2. The ratio of the height H of the piston head recess 2.2 to the diameter D of the piston head 2 or to the piston diameter D is about 0.2. The ratio of the recess diameter d to the diameter D of the piston head 2 is about 0.5.

According to FIG. 2, the piston 1 furthermore has a cooling passage 7 which is located in the region beneath the piston head edge 2.1.

The piston 1 according to FIG. 2 is part of an engine or engine block 6.

Figure 3:
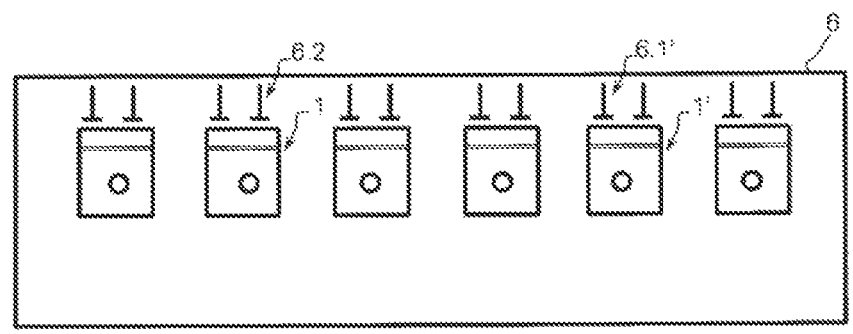
FIG. 3 shows a diagrammatic sketch of an engine.

According to FIG. 3, six of the previously described pistons 1, 1' are arranged inside the engine 6 or inside a cylinder block, which is not additionally shown, with corresponding gas exchange valves 6.1', 6.2.

INDUSTRIAL APPLICABILITY

The piston and engine block as described herein may be used in a diesel engine or Otto engine or Otto gas engine. In the case of the Otto engine or the Otto gas engine, it can be an engine with external or internal mixture forming.

A piston according to the present disclosure may be designed and that improved combustion may be achieved.

As described herein, according to an exemplary embodiment of the present disclosure, at least one valve pocket may be designed at least partially significantly deeper than is necessary for the free movement of the open gas exchange valve. The minimum distance a may be increased to a distance A, at least in the region of the piston recess wall, with A>=a+2 mm, A>=a+3 mm, or A>=a+4 mm, or A>=a+5 mm. The minimum distance A which is thereby achieved may be then absolutely at least between 4 mm and 15 mm, or between 6 mm and 15 mm, or between 7 mm and 15 mm in the cold state. The latter is at least in the region of the piston recess wall.

By deepening the valve pocket, the swirl flow which prevails in the region of the piston recess wall might be broken up so that a turbulent flow proportion is also established, improving the combustion. The valve pockets may be designed considerably deeper than would be actually necessary for the free movement of the valves. These embodiments may create a sharp break up of the swirl flow with low production cost at the same time. The previously described measure may increase the turbulence in the combustion chamber. The increased turbulence leads to an accelerated combustion and to a faster and better burn-out in the cylinder. As a result, the efficiency and the knock interval of the engine may be increased.

Should valve pockets not be necessary for the actual operation of a piston, then the effect according to the present disclosure can naturally also be achieved by adding valve pockets. Such an embodiment is to be seen to be included at least in the range of equivalence of the claim.

In the case that the minimum distance a is being increased to the distance A, at least in the region of the piston recess wall, so that the desired turbulence input is achieved, no provision may be necessary for valve pockets with a diameter which corresponds to the valve body. A cut-out in the piston head edge in the boundary region of the piston recess wall may be sufficient.

According to an exemplary embodiment of the present disclosure the ratio H/D of the depth H of the piston head recess to the diameter of the piston head or to the piston diameter D may be between 0.15 and 0.35.

It can also be advantageous to this end if the valve pocket has a valve pocket bottom with a surface normal N, wherein the surface normal N of at least one valve pocket is arranged in an inclined manner to the centre axis M by an angle β, with $1°<=β<=25°$, or $5°<=β<=20°$, or $5°<=β<=10°$, wherein the depth T increases towards the piston head recess. Therefore, the valve pocket, as already explained previously, may be designed slightly deeper, especially in the region of the piston recess wall. A stronger influence upon the swirl flow which prevails in the piston head recess may be associated therewith. Moreover, on account of the reduced depth T in the edge region of the piston, the strength of the piston or its architecture may be not disadvantageously influenced to an excessive degree. Furthermore, the squish flow in the region close to the cylinder wall may be better maintained.

In the design of the valve pocket, it can also be advantageous if the distance A fulfils the following condition: $0.05 H<=A<=0.5 H$, or $0.05 H<=A<=0.2 H$, or $0.1 H<=A<=0.2 H$, or $a+1 m<=A<=20 mm$. A further deepening of the entire valve pocket would as a rule excessively influence the strength of the piston or lead to a collision with cooling passages of the piston. If the valve pocket bottom, as explained below, is inclined, a further deepening may be possible at least in the region of the piston head recess. Therefore, the turbulence input may be increased. In this case, it can be advantageous if the valve pocket has a valve pocket bottom with a surface normal N, wherein the surface normal N of at least one valve pocket is arranged in an inclined manner to the centre axis M or to the centre axis of the corresponding gas exchange valve by an angle β, with $1°<=β<=25°$, or $5°<=β<=20°$, or $5°=β<=10°$, wherein a distance A increases towards the piston head recess.

Therefore, the valve pocket, as already explained above, can be formed slightly deeper at least in sections, that is to say especially in the region of the piston recess wall. The valve pocket bottom can be of a flat, concave, or convex design, or have a mixed shape of the aforesaid basic shapes. The surface normal represents at least one zone or only one point on the valve pocket bottom.

As a rule, in the case of large engines, the valves or their stem axes are oriented parallel to the piston axis. Should in this case a valve pocket may not be necessary for the purpose of free movement of the valve, then its valve pocket bottom is orientated at a right angle to the stem axis. There may be certainly no reason for an inclination of the valve pocket bottom.

When using an inclined or inwardly sloping valve pocket bottom, the distance between the valve and the valve pocket bottom varies in the case of such a large engine. The latter alone in order to ensure an increased turbulence input. The critical distance to the valve may be achieved only in the radially outer region of the valve pocket.

It can also be advantageous if the valve pocket has a depth T, at least in the region of the piston recess wall, wherein the depth T with respect to the height H fulfills the following condition: $0.05\ H <= T <= 0.5\ H$, or $0.05\ H <= T <= 0.2\ H$, or $0.1\ H <= T <= 0.2\ H$.

The region of the piston recess wall may be located at the level of the piston recess wall in the radial direction with regard to the centre axis M. An increased turbulence influence upon the swirl flow which prevails in the piston head recess may be associated with a valve pocket which is deepened to the maximum in the region of the piston recess wall. As a result of this design the strength of the piston or its architecture may be not disadvantageously influenced to an excessive degree.

The region of the piston recess wall, that is to say the region of the valve pocket close to the piston recess wall, may be arranged at the level of the piston recess wall in the radial direction to the centre axis M. The minimum distance a between the valve pocket or a valve pocket bottom and the corresponding gas exchange valve may be dependent on the size of the engine and its combustion chamber architecture and based on experience may be between 0.5 mm and 3 mm, at least in the operating state. In the cold state or in the shutdown state, the distance a can be somewhat larger.

The creation of the squish flow and the strengthening of the swirl flow may have a positive effect upon the combustion. It might be more positive, however, if these directed flows could be converted in a purposeful manner into turbulence since this would improve the combustion still further.

The invention claimed is:

1. A piston of an internal combustion engine, comprising:
a piston skirt having a centre axis; and
a piston head delimiting the piston skirt to a top, the piston head having a diameter D and including:
    a piston head edge;
    a piston head recess with a piston recess wall having a wall height H; and
    at least one valve pocket formed in the piston head edge, the at least one valve pocket having a valve pocket bottom disposed at a valve pocket depth T with respect to the piston head edge adjacent the piston skirt, the valve pocket bottom being inclined relative to the centre axis, wherein the valve pocket depth T with respect to the wall height H fulfils the following condition, at least in the region of the piston recess wall: $0.05\ H <= T <= 0.5\ H$.

2. The piston according to claim 1, wherein the valve pocket bottom is inclined relative to the centre axis by an angle $\beta$, with $1° <= \beta <= 25°$, wherein the depth T increases towards the piston head recess.

3. The piston according to claim 1, wherein the at least one valve pocket is a first valve pocket and the piston includes a plurality of valve pockets.

4. The piston according to claim 3, wherein a second valve pocket selected from the valve pockets has a second valve pocket bottom with a second surface normal arranged in an inclined manner relative to the center axis by an angle $\beta$.

5. The piston according to claim 4, wherein the angle $\beta$ ranges from 1° to 25° and the depth T increases towards the piston head recess.

6. An engine block of an internal combustion engine, comprising:
a piston guided in the engine block, including:
    a piston skirt having a first centre axis; and
    a piston head delimiting the piston skirt to a top, with a diameter D, wherein the piston head includes:
        a piston head edge;
        a piston head recess with a piston recess wall having a wall height H; and
        at least one valve pocket formed in the piston head edge, the at least one valve pocket having a valve pocket bottom; and
    at least one gas exchange valve having a second centre axis, the at least one gas exchange valve configured to be disposed partially within the at least one valve pocket at a distance "a" from the valve pocket bottom, wherein the distance a increases to a distance A at least in the region of the piston recess wall, with $A >= a+2$ mm.

7. The engine block according to claim 6, the distance A fulfilling the following condition: $0.05\ H <= A <= 0.5\ H$.

8. The engine block according to claim 6, the valve pocket bottom having a surface normal N arranged in an inclined manner to the first centre axis by an angle $\beta$, with $1° <= \beta <= 25°$.

9. The engine block according to claim 6, the valve pocket having a depth T, at least in the region of the piston recess wall, wherein the depth T with respect to the height H fulfils the following condition: $0.05\ H <= T <= 0.5\ H$.

10. The engine block according to claim 6, wherein the distance a is a minimum distance for ensuring a free movement of the open gas exchange valve, and a depth T of the valve pocket bottom adjacent the piston skirt exceeds the distance a by at least 1 mm.

11. An engine, comprising:
a piston, including:
    a piston skirt having a centre axis; and
    a piston head delimiting the piston skirt to a top, the piston head having a diameter D and including:
        a piston head edge;
        a piston head recess with a piston recess wall having a wall height H; and
        at least one valve pocket formed in the piston head edge, the at least one valve pocket having a valve pocket bottom disposed at a valve pocket depth T with respect to the piston head edge adjacent the piston skirt, the valve pocket bottom being inclined relative to the centre axis, wherein the valve pocket depth T with respect to the wall height H fulfils the following condition, at least in the region of the piston recess wall: $0.05\ H <= T <= 0.5\ H$.

12. An engine comprising an engine block including:
a piston guided in the engine block, including:
    a piston skirt having a first centre axis; and
    a piston head delimiting the piston skirt to a top, with a diameter D, wherein the piston head includes:
        a piston head edge;
        a piston head recess with a piston recess wall having a wall height H; and
        at least one valve pocket formed in the piston head edge, the at least one valve pocket having a valve pocket bottom; and
    at least one gas exchange valve having a second centre axis, the at least one gas exchange valve configured to be disposed partially within the at least one valve pocket at a distance "a" from the valve pocket bottom, wherein the distance a increases to a distance A at least in the region of the piston recess wall, with A>=a+2 mm.

13. The engine according to claim 12, wherein the valve pocket bottom has a surface normal arranged in an inclined manner relative to the first centre axis by an angle $\beta$, with $1°<=\beta<=25°$.

14. The engine according to claim 12, wherein the engine comprises at least one of a diesel engine, an Otto engine, and an Otto gas engine.

15. The engine according to claim 12, wherein the at least one valve pocket is a first valve pocket and the piston includes a plurality of valve pockets.

16. The engine according to claim 15, wherein a second valve pocket selected from the valve pockets has a second valve pocket bottom with a second surface normal arranged in an inclined manner relative to the first center axis by an angle $\beta$.

17. The engine according to claim 12, wherein the distance a is a minimum distance for ensuring a free movement of the open as exchange valve, and a depth T of the valve pocket bottom adjacent the piston skirt exceeds the distance a by at least 1 mm.

18. The engine according to claim 12, the distance A fulfilling the following condition: $0.05\ H<=A<=0.5\ H$.

19. The engine according to claim 12, wherein the distance A fulfils the condition $a+1\ mm<A<a+20\ mm$.

20. The engine according to claim 12, the valve pocket having a depth T, at least in the region of the piston recess wall, wherein the depth T with respect to the height H fulfils the following condition: $0.05\ H<=T<=0.5\ H$.

* * * * *